United States Patent Office 3,029,474
Patented Apr. 17, 1962

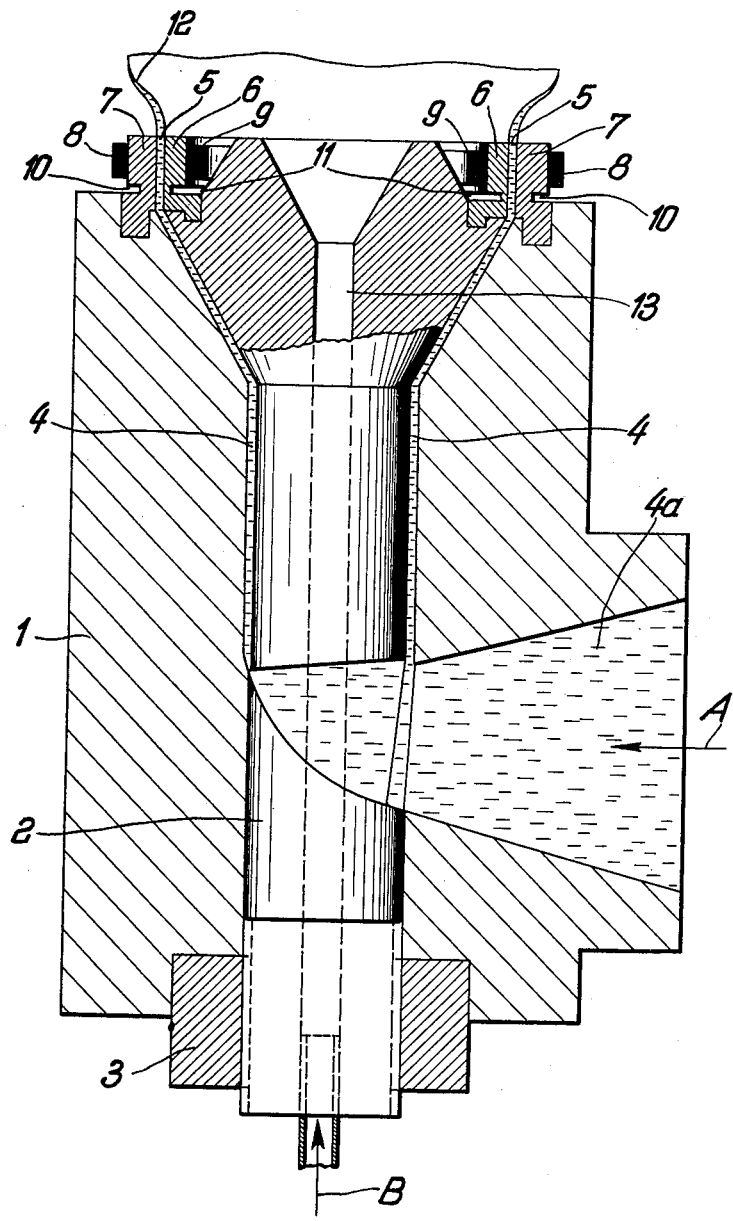

3,029,474
PROCESS AND APPARATUS FOR THE EXTRUSION OF THERMOPLASTIC MATERIAL
Wilfried Voigt, Wiesbaden-Biebrich, and Hermann Holch, Lorrach, Baden, Germany, assignors to Firma Lonza Electric and Chemical Works Limited, Gampel (Wallis), Switzerland
Filed July 7, 1958, Ser. No. 747,030
Claims priority, application Switzerland July 9, 1957
7 Claims. (Cl. 18—57)

The present invention relates to an improved process for the extrusion of sheets of thermoplastic material and to apparatus for performing this process.

It is common practice to produce sheets of synthetic thermoplastic materials such as polyvinyl chloride, polyvinyl acetate and copolymers of vinyl acetate and vinyl chloride, cellulose acetate and other cellulose esters, polyesters, polymethyl methacrylate, polyethylene, polypropylene, polyamides, polyacrylo-nitrile, polycarbonates and the like by extrusion. In this process the molten starting material is extruded from a shaping orifice under pressure. The process is used more particularly for the extrusion of tubular sheets and foils from an annular orifice. In the extrusion of tubular foils by the so-called blown-film process the tubular sheet released from the extruding dial is expanded by compressed gas admitted to the hollow space within the extrudate and is furthermore drawn off from the die in longitudinal direction.

The pressure prevailing in the molten thermoplastic material as it approaches the shaping orifice is substantially determined by the relative magnitude of the output of the extruder press which commonly is a screw press and the sectional area of the orifice. The pressure is furthermore dependent on the viscosity and the frictional properties of the molten synthetic material. If the pressure exceeds a critical limit, the tubular sheet produced has a rough surface, and such roughness is referred to hereinafter as "melt fracture." When, for example, rigid polyvinyl chloride is to be extruded, melt fracture may make it impossible to produce a clear transparent foil of satisfactory homogeneity.

It has already been attempted to prevent formation of a roughened sheet surface by reducing the pressure prevailing in the channel of the extruder head. It is possible, for example, to decrease the pressure by increasing the sectional area of the orifice at a given screw press output. One may also increase the temperature of the extruder head in order to reduce the viscosity of the material.

Both these previously suggested methods are subject to serious disadvantages. When the sectional area of the orifice is increased, the resistance offered by the orifice to the passage of the extruded material is reduced. This is detrimental to the homogeneity of the plasticized material just ahead of the extrusion die, and particularly so in angle heads in which the direction of flow of the plastic material is changed. The uniformity of the extrudate is reduced to an unsatisfactory extent.

When it is attempted to decrease the viscosity of the extrudate by increasing the temperature of the extrusion head, the danger of thermal decomposition of the plastic material is increased, and especially so when relatively temperature-sensitive materials such as polyvinyl chloride, are extruded from an angle head. Since the flow path of the material travelling on the inside of the angle is substantially shorter than that of the material travelling on the outside, the dwell time of the extruded material in the angle head varies over the cross-section of the extrudate, and it is very difficult to adjust temperatures within the extruder head in a manner so as to compensate for these variations in dwell time.

According to the process of the present invention, melt fracture of the surface of the extruded sheet is prevented by exposing to additional heating, the surface of the extrudate immediately before passage through the orifice at the end of the elongated channel within the extrusion head of the extruder. It has been found that the pressure prevailing in the channel ahead of the orifice is decreased only to a small and permissible extent by such heating. The back pressure created in the extrusion head is sufficient to ensure complete homogeneity of the material flowing under pressure towards the orifice. The supplemental exposure to heat of the plastic material immediately adjacent the orifice causes uniform extrusion of the material from the orifice so that a sheet of smooth surface structure and free from melt fracture is produced.

The invention also is concerned with an extruder head for performing the afore-described process in conjunction with a heated extruding press. According to the present invention at least one of the extrusion die elements defining the shaping orifice is provided with supplemental heating means adapted to the portion of the die adjacent the orifice. The heating means may be subdivided in sections which can be heated individually. The supplemental heating means have to be selected of such output that the operating temperature of the die bounding the shaping orifice is greater than the operating temperature of the die surfaces confining the elongated channel leading to the orifice.

The supplemental heating means are preferably electrical resistance heaters which are capable of close and convenient temperature control. The die portion adjacent the orifice, however, may also be heated directly or indirectly by means of induced eddy-currents of high frequency. In order to maintain the temperature differential between the walls adjacent to orifice and the die walls defining the elongated channel leading to the orifice, the invention contemplates to provide the die with constricted portions of reduced cross-section which limit the flow of heat, or any other arrangement creating a barrier to the heat flow.

Other features of the present invention and many of the attendant advantages will become apparent as the same becomes better understood from the following detailed description of a preferred embodiment when taken in conjunction with the attached drawing, in which:

The sole FIGURE shows an elevational axial section of an extruder head for performing the process of the invention.

Referring now to the drawing there is shown an extrusion die 1 having a mandrel 2 fastened centrally therein by means of a nut 3. Means may be provided for heating extrusion die 1 in a conventional manner. An annular channel 4 is formed between die 1 and mandrel 2 and communicates with the coordinated screw press in a well known manner by a funnel-shaped duct 4a through which thermoplastic synthetic material in extrudable molten condition is supplied by the screw press under pressure. Channel 4 leads to an annular shaping orifice 5 which is formed between two annular elements 6 and 7 attached respectively to mandrel 2 and die 1, and each equipped with an electric strip heater 8, 9 respectively. The base portions of annular elements 6 and 7 are constricted by deep annular grooves 10 and 11, respectively, so as to limit the flow of heat from electric strip heaters 8 and 9 to the body portions of die 1 and mandrel 2.

The molten synthetic material forced into funnel-shaped duct 4a in the direction of the arrow A and formed into a tubular sheet by passage through channel 4 leaves the orifice 5 as a relatively thick-walled tube and may then be further expanded as indicated at 12 by compressed air or another inert gas introduced under pressure into the central bore 13 of mandrel 2 in the direction of arrow B.

In a specific example of the use of the afore-described apparatus, a stabilized polyvinyl chloride resin composition containing no plasticizer was extruded through an annular shaping orifice having an internal diameter of 100 mm. and a radial width of 0.5 mm. at a rate of 12 kg./h., the temperature of the extruding die being held at 210° C., resulting in a pressure of substantially 3000 p.s.i. in channel 4. The tubular sheet produced under such conditions without supplemental heating of the extrudate immediately adjacent the orifice showed clear evidence of melt fracture the surface being distinctly roughened.

In a second run under otherwise identical conditions the annular elements 6 and 7 adjacent the shaping orifice (called "lips" hereinafter) were heated with strip heaters having an output of approximately 30 watts each, thereby elevating the lip-temperature by 10° C. or 5% over the temperature of the extrusion die. The contact time of the extrudate with the heated lips was 0.33 sec. The pressure in channel 4 dropped to approximately 2700 p.s.i. The extruded product, however, was perfectly smooth and could be expanded by compressed air to give a clear tubular foil having an entirely homogeneous surface.

It is not readily possible to determine the actual surface temperature of the plastic synthetic material at the instance of passage through the extrusion orifice, nor will the optimum temperature differential between the walls or orifice 5 and those confining channel 4 be the same with variations in die configuration, extruder output and after-treatment of the extrudate after leaving the shaping orifice. It will, however, be readily possible for those skilled in the art to determine temperature differentials best suited for any specific set of conditions. It is believed that the temperature of the extrudate remains substantially unchanged. However the short contact period of the extrudate with the over-heated lips of the orifice allows for better gliding conditions between the extrudate and said lips, thereby preventing the "melt fractures." The contact time between the heated lip surface and the extrudate varies between 0.01 sec. and 10 sec., favorably between 0.1 and 2 sec. The temperature of the lip-section of the extrusion die is 1–25%, favorably 2–10%, higher than the temperature of the extruding die.

Tests have shown that for polyvinyl chloride resin composition with or without plasticizers, stabilizers and other useful ingredients extrusion die temperatures of 160 to 220° C. according to the resin composition are favorable. This temperature varies of course with the materials which can be extruded, and examples of which are cited earlier in this specification. In general the temperature of the extruder die is usefully varied from as low as 40° C. for certain types of vinyl acetate resins to 340° C. for polycarbonates. It is well within the possibilities for those skilled in the art to determine the optimal extrusion die temperature for the various thermoplastic materials.

While the invention has been illustrated and described as embodied in an apparatus and a method for extruding tubular foil by the so-called "blown-film" process, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptions should and are intended to be comprehended within the meaning and range of equivalence of the following claims.

What is claimed as new and desired to be secured by Letters Patent is:

1. A process of extruding a tube of thermoplastic material, comprising the steps of extruding thermoplastic material into a tubular body having predetermined cross sectional diamensions; passing said tubular body at a first temperature sufficiently high to maintain said material in plastic condition through an annular guiding channel having throughout its length uniformly said cross sectional dimensions so that during such passage substantially no further rearrangement of said thermoplastic material of said tubular body will take place; and subjecting only the inner and outer faces of said tubular body during passage of the same through said annular guiding channel to a temperature higher than said first temperature without increasing the temperature of the innermost portion of said tubular body, whereby a tube of thermoplastic material substantially free of surface melt fracture, is formed.

2. A process of extending a tube of thermoplastic material, comprising the steps of extruding thermoplastic material into a tubular body having predetermined cross sectional dimensions; passing said tubular body at a first temperature sufficiently high to maintain said material in plastic condition through an annular guilding channel having throughout its length uniformly said cross sectional dimensions so that during such passage substantially no further rearrangement of said thermoplastic material of said tubular body will take place; and subjecting only the inner and outer faces of said tubular body during passage of the same through said annular guiding channel to a temperature 1 to 25% higher than said first temperature expressed in degree centigrade substantially without increasing the temperature of the innermost portion of said tubular body, whereby a tube of thermoplastic material substantially free of surface melt fracture, is formed.

3. A process of extruding a tube of thermoplastic material, comprising the steps of extruding thermoplastic material into a tubular body having predetermined cross sectional dimensions; passing said tubular body at a first temperature sufficiently high to maintain said material in plastic condition through an annular guiding channel having throughout its length uniformly said cross sectional dimensions so that during such passage substantially no further rearrangement of said thermoplastic material of said tubular body will take place; and subjecting only the inner and outer faces of said tubular body during passage of the same through said annular guiding channel to a temperature 2 to 10% higher than said first temperature expressed in degrees centigrade substantially without increasing the temperature of the innermost portion of said tubular body, whereby a tube of thermoplastic material substantially free of surface melt fracture, is formed.

4. A process of extruding a tube of thermosplastic material, comprising the steps of extruding thermoplastic material into a tubular body having predetermined cross sectional dimensions; passing said tubular body at a first temperature sufficiently high to maintain said material in plastic condition through an annular guiding channel having throughout its length uniformly said cross sectional dimensions so that during such passage substantially no further rearrangement of said thermoplastic material of said tubular body will take place; and subjecting only the inner and outer faces of said tubular body during passage of the same through said anular guiding channel for a period of between 0.01 and 10 seconds to a temperature higher than said first temperature substantially without increasing the temperature of the innermost portion of said tubular body, whereby a tube of thermoplastic material substantially free of surface melt fracture, is formed.

5. A process of extruding a tube of thermoplastic material, comprising the steps of extruding thermoplastic material into a tubular body having predetermined cross sectional dimensions; passing said tubular body at a first temperature sufficiently high to maintain said material in plastic condition through an annular guiding channel having throughout its length uniformly said cross sectional dimensions so that during such passage substantially no further rearrangement of said thermoplastic material of said tubular body will take place; and subjecting only the inner and outer faces of said tubular body during passage of the same through said annular guiding channel for a period of between 0.01 and 10 seconds to a temperature 1 to 25% higher than said first temperature expressed in degrees centigrade substantially without increasing the temperature of the innermost portion of said tubular body, whereby a tube of thermoplastic material substantially free of surface melt fracture, is formed.

6. A process of extruding a tube of thermoplastic material, comprising the steps of extruding thermoplastic material into a tubular body having predetermined cross sectional dimensions; passing said tubular body at a first temperature sufficiently high to maintain said material in plastic condition through an annular guiding channel having throughout its length uniformly said cross sectional dimensions so that during such passage substantially no further rearrangement of said thermoplastic material of said tubular body take place; and subjecting only the inner and outer faces of said tubular body during passage of the same through said annular guiding channel for a period of between 0.1 to 2 seconds to a temperature higher than said first temperature substantially without increasing the temperature of the innermost portion of said tubular body, whereby a tube of thermoplastic material substantially free of surface melt fracture, is formed.

7. A process of extruding a tube of thermoplastic material, comprising the steps of extruding thermoplastic material into a tubular body having predetermined cross sectional dimensions; passing said tubular body at a first temperature sufficiently high to maintain said material in plastic condition through an annular guiding channel having throughout its length uniformly said cross sectional dimensions so that during such passage substantially no further rearrangement of said thermoplastic material of said tubular body will take place; and subjecting only the inner and outer faces of said tubular body during passage of the same through said annular guiding channel for a period of between 0.1 and 2 seconds to a temperature 2–10% higher than said first temperature expressed in degrees centigrade and without increasing the temperature of the innermost portion of said tubular body, whereby a tube of thermoplastic material substantially free of surface melt fracture, is formed.

References Cited in the file of this patent

UNITED STATES PATENTS

| | | |
|---|---|---|
| 2,208,285 | Allyne | July 16, 1940 |
| 2,210,004 | Rautenstrauch | Aug. 6, 1940 |
| 2,266,956 | Brundage | Dec. 23, 1941 |
| 2,461,630 | Cozzo | Feb. 15, 1949 |
| 2,519,375 | Jargstorff et al. | Aug. 22, 1950 |
| 2,585,112 | Gravesen | Feb. 12, 1952 |
| 2,666,947 | Shaw | Jan. 26, 1954 |
| 2,702,408 | Hartland | Feb. 22, 1955 |
| 2,876,497 | Alexander | Mar. 10, 1959 |

FOREIGN PATENTS

| | | |
|---|---|---|
| 713,007 | Great Britain | Aug. 4, 1954 |
| 714,194 | Great Britain | Aug. 25, 1954 |